| United States Patent [19] | [11] Patent Number: 4,582,689 |
| Kordosky | [45] Date of Patent: Apr. 15, 1986 |

[54] SOLVENT EXTRACTION PROCESS

[75] Inventor: Gary A. Kordosky, Tucson, Ariz.

[73] Assignee: Henkel Corporation, Minneapolis, Minn.

[21] Appl. No.: 350,619

[22] Filed: Feb. 22, 1982

[51] Int. Cl.$^4$ ............................................. B01D 11/00
[52] U.S. Cl. .................... 423/24; 423/139; 423/DIG. 14; 75/101 BE; 75/117
[58] Field of Search ................. 423/24, DIG. 14, 139; 75/101 BE, 117

[56] References Cited

U.S. PATENT DOCUMENTS 3,479,378 11/1969 Orlandini .............................. 423/24
3,927,169 12/1975 Goren .................................... 423/24

OTHER PUBLICATIONS

*Chemistry and Industry*, Sep. 3, 1977, pp. 706–718.

Ritcey, *CIM Bulletin*, Feb. 1974, pp. 87–92.

*Primary Examiner*—John Doll
*Assistant Examiner*—Robert L. Stoll
*Attorney, Agent, or Firm*—Marshall, O'Toole, Gerstein, Murray & Bicknell

[57] ABSTRACT

Improved solvent extraction processes for recovery of copper values from aqueous solutions which also contain dissolved iron values. In continuous, multiple stage, solvent extraction circuits, the overall copper/iron selectivity of reagents including hydroxy oxime extractants is enhanced by providing non-uniform residence times for aqueous feedstocks in extraction stages, i.e., longer effective residence times for the feedstocks in one or more initial extraction stages of contact with the reagent than in subsequent stages of contact with the reagent.

9 Claims, No Drawings

SOLVENT EXTRACTION PROCESS

BACKGROUND

The present invention relates generally to solvent extraction processes for recovery of metal values from aqueous solutions and, more particularly, to the enhancement of copper/iron selectivity in the use of certain extraction reagents.

The starting material for large scale solvent extraction processing of copper is an aqueous leach solution obtained from a body of ore which contains a mixture of metals in addition to copper. The leaching medium dissolves salts of copper and other metals as it trickles through the ore, to provide an aqueous solution of the mixture of metal values. The metal values are usually leached with sulfuric acid medium, providing an acidic aqueous solution, but can also be leached by ammonia to provide a basic aqueous solution.

The aqueous solution is mixed in tanks with an extraction reagent which is dissolved in an organic solvent, e.g., a kerosene. The reagent includes an extractant chemical which selectively forms metal-extractant complex with the copper ions in preference to ions of other metals. The step of forming the complex is called the extraction or loading stage of the solvent extraction process.

The outlet of the mixer continously feeds to a large settling tank, where the organic solvent (organic phase), now containing the copper-extractant complex in solution, is separated from the depleted aqueous solution (aqueous phase). This part of the process is called phase separation. Usually, the process of extraction is repeated through two or more mixer/settler stages, in order to more completely extract the desired metal.

Where two or more mixer-settler stages are employed for extraction, countercurrent flow of the feedstock aqueous solution and the organic phase or reagent solution is employed. In a typical 3-stage extraction system, for example, the feedstock will flow through an initial mixer-settler stage ("E-1"), subsequently through a second stage ("E-2"), and then through a final mixer-settler stage ("E-3"). The organic phase will, in turn, initially contact the feedstock in E-3, encounter a subsequent contact in E-2 and a final contact in E-1. As a result, by the time the feedstock reaches mixer-settler stage E-3, substantial amounts of copper will have been extracted from it and it will be cantacting an organic phase replete in copper. Correlatively, when the organic phase reaches mixer-settler stage E-1, much of the extractant will be in the form of copper-extractant complex and the organic phase will be contacting the feedstock solution when it is in a condition wherein little, if any, of the dissolved copper has been extracted.

After extraction, the depleted aqueous feedstock (raffinate) is either discharged or recirculated to the ore body for further leaching. The loaded organic phase containing the dissolved copper-extractant complex is fed to another set of mixer tanks, where it is mixed with an aqueous strip solution of concentrated sulfuric acid. The highly acid strip solution breaks apart the copper-extractant complex and permits the purified and concentrated copper to pass to the strip aqueous phase. As in the extraction process decribed above, the mixture is fed to another settler tank for phase separation. This process of breaking the copper-extractant complex is called the stripping stage, and the stripping operation is repeated through two or more mixer-settler stages to more completely strip the copper from the organic phase.

From the stripping settler tank, the regenerated stripped organic phase is recycled to the extraction mixers to begin extraction again, and the strip aqueous phase is customarily fed to an electrowinning tankhouse, where the copper metal values are deposited on plates by a process of electrodeposition. After electrowinning the copper values from the aqueous solution, the solution, known as spent electrolyte, is returned to the stripping mixers to begin stripping again.

Among the more problematic copper bearing feedstocks treated in conventional solvent extraction processes are those which include substantial quantities of dissolved iron values. Frequently the extractant chemical employed will form an iron-extractant complex which, in turn, results in the presence of iron in the strip aqueous phase. Where electrowinning is employed to recover copper from the strip aqueous solution, the presence of iron will complicate recovery by decreasing current efficiency, by corrosively affecting cathodes, and the like. To avoid such problems, a more or less constant "bleed" of the tankhouse solution is established, with the solution bled off being circulated back into the initial feedstock or to the leech pile itself. Because such tankhouse bleed solutions contain appreciable amounts of copper and acid, efficiency of the entire system can be compromised.

The currently more favored reagents employed in recovery of copper values from aqueous solutions having iron values present are those which exhibit a relatively high degree of copper/iron selectivity, i.e., those which, under standard operating conditions, extract a high proportion of the copper present in the feedstock but only a minor proportion of the iron present. Among the reagents credited with displaying good copper/iron selectivity characteristics are those including hydroxy aryl oxime extractants such as long chain alkyl or alkenyl solubilized hydroxy aryl aldoximes and ketone oximes. See, for example, Birch, "The Evaluation of the New Copper Extractant 'P-1'" appearing in the Proceedings of the 1974 International Solvent Extraction Conference, pp. 2837–2871, wherein "high selectivity against Fe (III) . . . in the sulphate system" is attributed to a reagent containing a 2-hydroxy-5-nonyl benzaldoxime extractant.

None of the above-noted hydroxy aryl oxime-containing reagents has proven to selective of copper in copper and iron-bearing solutions to the complete exclusion of iron. As a result, recovery of copper from such solutions necessitates at least some bleeding off of tankhouse solutions with losses to the overall economy of the system.

Of interest to the background of the present invention are certain prevailing practices in the art of constructing and operating continuous, multi-stage solvent extraction plants. Despite significant variations among different commercial plants in terms of reagent used, organic and aqueous flow rates, length to width ratios of mixer-settlers, and the like, all plants are uniform in their practice of providing substantially identical residence times for feedstock/reagent mixtures in each of the two or more mixer-settler stages of the plant. This uniformity of residence time is ordinarily accomplished by using mixer-settler tanks of equal volume in all extraction stages and by providing for uniform admixture of the countercurrently flowing aqueous feedstock and organic phase at each extraction stage (e.g., through use of identically-sized impellers rotating at the same rate). Indeed, once the number of stages and the phase ratio for a given system have been decided, the residence time (and hence the mixer-settler size) is determined with no apparent consideration given to the possibility that there could or should be any variation between extraction stages. See, e.g., Godfrey, et al. Chemistry and Industry, No. 17, pp. 713–718 (1977). This is due in part to the observation that the nearly completely "loaded" organic phase will gain little (considered in terms of additional copper extracted) by an extended contact with the aqueous feedstock in, e.g., an E-1 mixer-settler stage, and correlatively, the copper-depleted feedstock will not yield significant additional amounts of copper by reason of extended contact with the organic phase in, e.g., the E-3 stage. The uniform extraction mixer-settler stage residence times are generally set in the range of from about 2 ½ minutes to about 3 minutes. See, e.g., Tumily, et al., *Adv. In Extractive Metallury Int'l. Symp.* 3rd., pp. 123–131 (1977) (London).

BRIEF SUMMARY

The present invention is an improvement in solvent extraction processes for recovery of copper values from aqueous feedstock solutions which also contain iron values. More specifically, the invention provides for the effective enhancement of the copper/iron selectivity characteristics of hydroxy aryl oxime extractant-containing reagents through providing for non-uniformity of retention times for mixtures of aqueous feedstocks and reagent-containing organic phases in the mixer-settler stages of multistage extraction systems.

In one of its aspects, the present invention is seen to be an improvement in present solvent extraction processes for the recovery of copper from an aqueous feedstock solution containing dissolved copper and iron values wherein the feedstock is contacted with an organic phase comprising a reagent composition including an hydroxy aryl oxime extractant and wherein contact between the feedstock and the organic phase is accomplished by means of countercurrent flow of the feedstock and organic phase through two or more mixer-settler stages. The molar ratio of copper-extractant complexes to iron-extractant complexes in the mixer-settler stage wherein the aqueous feedstock initially contacts the organic phase is increased (and the overall copper/iron selectivity of the reagent is enhanced) by providing for longer residence times for the feedstocks in those mixer settler stages wherein the feedstock initially contacts the organic phase than in one or more of the mixer-settler stages wherein the feedstock subsequently contacts the organic phase.

Preferred reagents for use in practice of the improved processes of the invention are those which include one or more soluble hydroxy aryl oxime extractants as hereinafter described in detail. The presently most preferred reagents are those which include 2-hydroxy-5-nonyl benzaldoxime and/or 2-hydroxy-5-dodecyl benzaldoxime and/or 2-hydroxy-5-nonyl phenyl methyl ketone oxime.

While benefits attend solvent extraction processes of the invention practiced on aqueous feedstocks containing any iron values at all, they are expected to be greatest in treatment of feedstocks wherein the ratio of copper ($Cu^{+2}$) to iron ($Fe^{+3}$) is from about 1 to 0.5 or greater, i.e., in the range 1 to 1 up through 1 to 5 or more. Significant benefits will attend providing for a feedstock residence time in one or more of the mixer-settler wherein the feedstock initially contacts the organic phase which is from 1.1 to 5.0 times longer than the residence time of the feedstock in any of one or more mixer-settler stages wherein it subsequently contacts the organic phase.

In a typical solvent extraction system involving three mixer-settler stages, ("E-1", "E-2" and "E-3"), the overall copper/iron selectivity of the reagent can be readily enhanced by providing a residence time for the feedstock in the E-1 stage which is approximately twice as long as those in the two subsequent extraction stages (E-2 and E-3) wherein residence times may themselves be equal. Alternatively, the residence time in the E-1 extraction stage may be fixed and the retention times in the E-2 and E-3 stages may be respectively adjusted so as to be progressively shorter than that in E-1.

Other aspects of the present invention will become apparent upon consideration of the following detailed description and illustrative examples.

DETAILED DESCRIPTION

Reagents for use in practice of the improved processes of the invention include those containing one or more hydroxy aryl oxime extractants of the hydroxy aryl aldoxime or hydroxy aryl ketone oxime type.

Hydroxy aryl ketoxime extractants which may be employed in reagents for practice of the invention are those of Formulas I and II below:

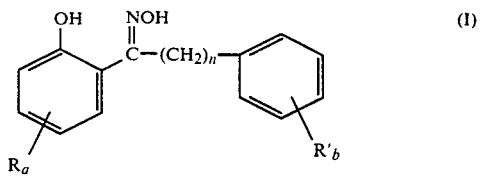

in which R and R' may be individually alike or different and are saturated aliphatic groups of 1–25 carbon atoms, ethylenically unsaturated aliphatic groups of 3–25 carbon atoms or —OR" where R" is a saturated or ethylenically unsaturated aliphatic group as defined; n is 0 or 1; and a and b are each 0, 1, 2, 3 or 4, with the proviso that both are not 0 and the total number of carbon atoms in $R_a$ and $R'_b$ is from 3 to 25,

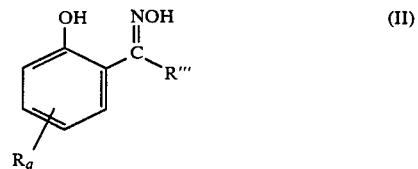

in which R and a are as defined with respect to Formula I and R''' is a saturated aliphatic group of 1–25 carbon atoms or an ethylenically unsaturated aliphatic group of 3–25 carbon atoms, with the proviso that the total number of carbon atoms in $R_a$ and R''' is from 3 to 25.

Preferred compounds of Formula I are those wherein a is 1, b is 0, R is a straight or branched chain alkyl group having from 7 to 12 carbon atoms, and wherein R is attached in a position para to the hydroxyl group. Among these, the more preferred are those wherein R is a mixture of isomers. Preferred compounds of Formula II are those wherein R''' is methyl and R and a are as designated as being preferred for compounds of Formula I.

Compounds of Formula I wherein n has a value of 0 (i.e., hydroxy benzophenone oxime compounds) may suitably be prepared according to the methods disclosed in swanson U.S. Pat. Nos. 3,952,775 and 3,428,449. By reason of ease and economy of synthesis from available starting materials, ready solubility in organic diluents commonly employed in solvent extraction and desirable properties of complexes of the compounds with copper, preferred benzophenone oxime compounds of Formula I include those having a single alkyl ring substituent having from 7 to 12 carbon atoms in a position para to the hydroxyl group, which alkyl substituent is a mixture of isomers. Examples of such compounds are 2-hydroxy-5-nonyl benzophenone oxime and 2-hydroxy-5-dodecyl benzophenone oxime which are obtained as mixtures of alkyl isomeric forms when commercial nonylphenol and dodecyl phenol are respectively employed in their synthesis.

Compounds of Formula I wherein n has a value of 1 (i.e., hydroxy phenyl benzyl ketone oxime compounds) may suitably be prepared according to the methods described in Anderson, U.S. Pat. No. 4,029,704. Preferred phenyl benzyl ketone oximes, like the above-noted benzophenone oximes, are those having an isomeric mixture of 7 to 12 carbon alkyl groups as a single substituent on the ring para to the hydroxyl group. These preferred compounds are exemplified by the compound, 2-hydroxy-5-nonylphenyl benzyl ketone oxime, as manufactured from a commercial nonylphenol comprising a mixture of nonyl isomeric forms.

Compounds of Formula II (i.e., hydroxy phenyl alkyl ketone oxime compounds) may suitably be prepared according to the procedures disclosed in U.K. Pat. No. 1,322,532. As noted with regard to benzophenone oxime and phenyl benzyl ketone oxime compunds of Formula I, preferred phenyl alkyl ketone oxime compounds of Formula II are those having an isomeric mixture of 7 to 12 carbon alkyl groups as a single substituent on the ring para to the hydroxyl group. Also preferred are compounds wherein the R''' alkyl group is methyl. Consequently, illustrative of preferred phenyl alkyl ketone oxime compounds is 2-hydroxy-5-nonyl phenyl methyl ketone oxime manufactured through use of commercial nonylphenol.

Hydroxy aryl aldoxime extractants which may be employed in reagents for practice of the invention are those of Formula III

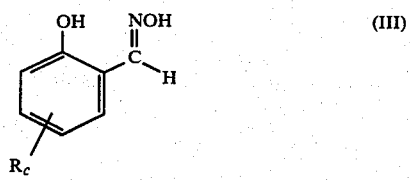

(III)

in which R is as defined above with respect to Formulas I and II, c has a value of 1, 2, 3 or 4, and the total number of carbon atoms in $R_c$ is from 3 to 25. Preferred compounds of Formula III are those wherein c is 1, R is a straight or branched chain alkyl group having from 7 to 12 carbon atoms, and wherein R is attached in a position para to the hydroxyl group. Among these, the more preferred are those wherein R is a mixture of isomers.

Compounds of Formula III (i.e., hydroxy benzaldoxime compounds, sometimes referred to as "salicylaldoximes") may suitably be prepared according to the methods described in Ackerley, et al., U.S. Pat. Nos. 4,020,105 or Ackerley, et al., 4,020,106 or by oximation of aldehydes prepared according to Beswick, U.S. Pat. No. 4,085,146. Again, preferred compounds are those having an isomeric mixtures of isomeric 7 to 12 carbon alkyl groups as a single substituent para to the hydroxyl group. Mixed alkyl isomeric forms of 2-hydroxy-5-heptyl benzaldoxime, 2-hydroxy-5-octyl benzaldoxime, 2-hydroxy-5-nonyl benzaldoxime and 2-hydroxy-5-dodecyl benzaldoxime are thus preferred.

Reagents useful in practice of the invention may include either kinetic additives or equilibrium modifiers or both. Preferred kinetic additives include α-hydroxy oximes described in Swanson, U.S. Pat. No. 3,224,873 and α, β-dioximes described in Koenders, et al., U.S. Pat. No. 4,173,616. Preferred equilibrium modifier chemicals include aliphatic alcohols such as tridecanol, alkyl phenols such as nonylphenol and organophosphorous compounds such as tributyl phosphate.

Reagents may include a single extractant chemical as illustrated above or may comprise mixtures of different aldoxime or ketoxime extractants or even mixtures of both aldoxime and ketoxime extractants of the type illustrated in co-pending U.S. patent application Ser. No. 340,991, filed Jan. 25, 1981 by Kordosky, et al.

Determination of the degree to which a given solvent extraction process employing a reagent with an hydroxy aryl oxime extractant of the type illustrated above will benefit by practice of the invention can easily be empirically determined on the basis of the reagent's capacity to display "copper/iron crowding" characteristics. Reagents most advantageously used specifically include those which will initially "load" both iron and copper from an aqueous feedstock under conditions commonly employed in commercial solvent extraction, but which will retain lesser amounts of iron in iron-extractant complex form upon continued agitated contact of the copper-containing feedstock with the reagent. The display of copper/iron crowding characteristics by three commercial copper extraction reagents is illustrated in Example 1 below.

EXAMPLE I

A series of mixer box kinetic studies was run on various commercially available metal extractants at equal concentrations with aqueous feed containing 4.05 g/l $Cu^{+2}$ and 5.0 g/l $Fe^{3+}$ at a pH of 2.0. The reagent compositions tested included the following:

(1) LIX ®622 (Henkel Corporation; about 1.8 molar in 2-hydroxy-5-dodecyl benzaldoxime and 1.1 molar in tridecanol, in Escaid 100 solvent);

(2) Acorga P-5100 (Acorga, Ltd., Hamilton, Bermuda; about 1.8 molar in 2-hydroxy-5-nonyl benzaldoxime and 2.16 molar in nonylphenol, in Escaid solvent); and (3) SME 530 (Shell Chemical Company; about 1.8 molar in 2-hydroxy-5-nonyl phenyl methyl ketone oxime and approximately 0.02 molar in an α, β-dioxime of the type illustrated in Example 3 of U.S. Pat. No. 4,173,616).

The reagents were used at selected volume percents in Kermac 500T (Kerr-MacGee Corporation), a commercially available kerosene designed for solvent extraction work. The mixer box had internal dimensions of 2½×2½×3½ inches and the mixing was uniformly set at 1800 rpms with a 1¼ inch impellor with 5 equally spaced slots. Samples of the emulsion were removed periodically and after the phases separated the organic phase was analyzed for copper and iron. The data obtained is set out in Table I below.

by additional shaking for a specified time. Organic samples were then analyzed for copper and iron. The data in Table II shows that a mixer residence time longer than 3 minutes would result in an improved Cu/Fe ratio on loaded organic using either reagent.

TABLE II

| Time of Sample | P-5100 Circuit | | | | Equilibration Time | $LIX^R 622$ Circuit | | | |
|---|---|---|---|---|---|---|---|---|---|
| | Non-equilibrated Sample | | Equilibrated Sample | | | Non-equilibrated Sample | | Equilibrated Sample | |
| | Cu g/l | Fe ppm | Cu g/l | Fe ppm | | Cu g/l | Fe ppm | Cu g/l | Fe ppm |
| 1255 hrs. | 3.17 | 20 | 3.15 | 16 | 2 min | 3.14 | 20 | 3.24 | 14 |
| 1330 hrs. | 3.13 | 15 | 3.16 | 11 | 3 min | 3.18 | 14 | 3.27 | 10 |
| 1425 hrs. | 3.25 | 16 | 3.28 | 11 | 4 min | 3.24 | 14 | 3.30 | 10 |
| 1500 hrs. | 3.18 | 14 | 3.14 | 10 | 1 min | 3.20 | 14 | 3.22 | 10 |
| 1525 hrs. | 3.16 | 16 | 3.15 | 12 | 2 min | 3.13 | 16 | 3.14 | 12 |

TABLE I

| Sample Time | 6% v/v $LIX^R 622$ | | 6% v/v P5100 | | 7.2% v.v SME 530 | |
|---|---|---|---|---|---|---|
| | g/l Cu | g/l Fe | g/l Cu | g/l Fe | g/l Cu | g/l Fe |
| 0 | 0 | 0 | 0 | 0 | 0 | 0 |
| 15 sec | 2.01 | .009 | 2.28 | .004 | 1.63 | .007 |
| 30 sec | 2.27 | .006 | 2.59 | .004 | 1.94 | .012 |
| 60 sec | 2.52 | .002 | 2.62 | .004 | 2.31 | .015 |
| 90 sec | 2.60 | N.D.* | 2.71 | .003 | 2.37 | .016 |
| 120 sec | 2.53 | " | 2.67 | .006 | 2.43 | .008 |
| 180 sec | 2.66 | " | 2.70 | .006 | 2.40 | .011 |
| 5 min | 2.67 | " | 2.63 | .001 | 2.40 | .011 |
| 10 min | 2.66 | " | 2.69 | N.D. | 2.54 | .011 |

*None Detected

It is apparent from the above that the commercial reagents LIX®622, P5100 and SME 530 display copper-iron crowding characteristics and may be quite advantageously used in the practice of the invention.

Substantial improvement in overall copper/iron selectivity for two of the above-noted commercial reagents is illustrated by the description of practice of the invention set out in Example II.

EXAMPLE II

Two side-by-side solvent extraction circuits were set up to contain 2 extraction stages (E-1 and E-2) and 2 strip stages. The aqueous feed to the circuits contained 2.03 g/l $Cu^{+2}$, 20 g/l $Fe^{+3}$ at a pH of 1.4. The strip solution was 25 g/l Cu and 160 g/l $H_2SO_4$. One circuit employed Acorga P5100 and the other employed LIX®622, both at a concentration of 6.5 v/v % in Kermac 500T. The respective circuits were run for 12 hours in order to establish identical equilibrium conditions with respect to feed flow, organic flow and a 3 minute mixer retention time. Both circuits routinely showed a 0.2 g/l Cu raffinate. Over a 2½ hour period, 10 ml samples of emulsion were periodically removed from the extraction "stage one" mixer (E-1) of each circuit and treated in the following manner. A 10 ml sample of emulsion was removed and drained into a small beaker allowing the phases to immediately separate. Then a second 10 ml sample was removed and drained into a 30 ml separatory funnel and equilibrated Advantages of practice of the invention in operation of a continuous, multi-stage solvent extraction circuit are illustrated in Example III.

EXAMPLE III

A continuous solvent extraction circuit was set up to contain 3 extraction stages (E-1, E-2, and E-3) along with 2 stripping stages. Provision was made so that the mixer retention time in extraction stage E-1 could be varied. An aqueous solution containing 2.00 g/l $Cu^{2+}$, 5 g/l $Fe^{3+}$ at a pH of 2.0 was used as the circuit feed while the organic was 7 v/v % LIX®622 in Kermac 470B. The circuit was run for three 7½ to 8 hour periods under exactly the same conditions except for the volume of the mixer in extraction stage (E-1). The values given in Table III, below, summarize the data obtained. Values reported are averaged for all the values determined over the particular day's run.

TABLE III

| Day | Mixer Retention Time (min.) | | | Loaded Organic | | Stripped Organic | | Raffinate | Strip Electrolyte | | Pregnant Electrolyte | |
|---|---|---|---|---|---|---|---|---|---|---|---|---|
| | E-1 | E-2 | E-3 | Cu | Fe | Cu | Fe | Cu | Cu | Fe | Cu | Fe |
| 1 | 2.5 | 2.5 | 2.5 | 3.49 | .049 | 1.64 | N.D.* | .016 | 30.0 | .023 | 48.6 | .58 |
| 2 | 3.5 | 2.5 | 2.5 | 3.59 | .045 | 1.59 | N.D. | .014 | 30.0 | .023 | 51.3 | .55 |
| 3 | 4.6 | 2.5 | 2.5 | 3.59 | .032 | 1.67 | N.D. | .012 | 30.0 | .023 | 50.8 | .43 |

*None Detected

The data set out in Table III provide evidence of some of the substantial advantages which may be obtained through practice of the invention. If an electrowinning tankhouse can be operated with an iron content of 3.0 g/l, then operation under the conditions of day 1 would requiire a tankhouse bleed of 18.7%. Operation under the conditions of day 3, however, would require a tankhouse bleed of only 13.7%. Because a typical tankhouse bleed contains about 30 g/l copper, this could represent a significant copper loss if bled to the leach pile. If bled to the feedstock, an overall increase in the size of the whole solvent extraction circuit would be needed.

Clearly, increases in E-1 stage residence time greater than shown in Table III may be warranted. As one example, two samples of emulsion were removed from stage E-1 during the procedure of day 1. One sample was simply allowed to separate on standing while the other was vigorously shaken in a separatory funnel for 4 minutes before the phases were allowed to separate. The respective organic phases were analyzed for copper and iron. For the sample not shaken, the copper-iron ratio was 77:1. The sample given the additional agitation (essentially provided with a total effective E-1 mixing time of approximately 6.5 minutes) displayed a copper/iron ratio of 746:1.

In order to illustrate the manner in which the present invention may be practiced in the operation of a full scale commercial solvent extraction, Table IV sets out proposed design and operation characteristics for a plant which could employ LIX ®622 to treat a feedstock solution having 8 g/l $Cu^{+2}$; 15 g/l $Fe^{+3}$; 0.5 to 1.5 g/l $NO_3^-$; and pH 2.0.

TABLE IV

| Staging | 5 stages. 3 extraction, 2 strip |
|---|---|
| Feed Flow | 160 gal/min |
| Organic Flow | 160 gal/min |
| Total Flow | 320 gal/min |
| Mixer Residence Times | |
| E-1 | 5 minutes |
| E-2 | 4 minutes |
| E-3 | 3 minutes |
| Mixer Dimensions/Volume | |
| E-1 | 5' × 5' × 4.5'/1600 gal |
| E-2 | 4' × 4' × 5'/1280 gal |
| E-3 | 4' × 4' × 4'/960 gal |
| S-1 | 4' × 4' × 4'/960 gal |
| S-2 | 4' × 4' × 4'/960 gal |

In Example III, above, benefits of the invention were seen to attend providing a selected residence time for the incoming feedstock solution in the first (E-1) extraction stage and identical lesser residence times in the two subsequent contact stages (E-2 and E-3). Table III above indicates that advantage can be obtained by providing a selected residence time in E-1, a lesser time in E-2 and a still lesser amount of time in E-3. Adjustments in mixer-settler volumes allow for maintenance of constant countercurrent flow rates. While benefits could attend providing for extended residence time only in an intial stage which is not the "first" extraction stage at which the aqueous feedstock contacts the organic phase (i.e., stage E-2 in a 3-stage extraction system) such practices are not presently preferred.

As previously indicated, substantial benefits in enhancement of overall copper/iron selectivity of reagents can be derived where the ratio of copper ($Cu^{+2}$) to iron ($Fe^{+3}$) in the feedstock is from 1:0.5 or greater, e.g., in the range of 1:1 to 1:5 or more. While benefits will attend providing for a residence time in one or more initial stages which is as little as 1.1 times as long as in one or more subsequent stages, retention times in an initial stage as much as 5 times longer than in any subsequent stage may be employed. Further, as illustrated in Table IV, where three or more extraction stages are employed, the residence time may gradually diminish throughout the stages. In this respect, exemplary residence times in a 3-stage extraction system might be set to provide twice the residence time in E-1 as in E-2 with the latter, in turn, having a residence time which is twice that in E-3.

Modifications and variations in the practice of the invention as illustrated above are expected to occur to those skilled in the art and consequently only those limitations as appear in the appended claims should be placed thereon.

What is claimed is:

1. In a solvent extraction process for recovery of copper from an aqueous feedstock solution containing dissolved copper and iron values wherein the feedstock is contacted with an organic phase comprising a reagent composition including an hydroxy aryl oxime extractant, and wherein contact between the feedstock and the organic phase is accomplished by means of countercurrent flow of feedstock and organic phase through two or more mixer-settler extraction stages, the improvement comprising: providing longer residence time for the feedstock in one or more of said mixer-settler stages wherein the feedstock initially contacts the organic phase than in one or more of the mixer-settler stages wherein the feedstock subsequently contacts the organic phase, whereby the molar ratio of copper-extractant complexes to iron-extractant complexes formed in the mixer-settler stage wherein the feedstock initially contacts the organic phase is increased and the overall copper/iron selectivity of the reagent composition is enhanced.

2. The process of claim 1 wherein the residence time of the feedstock in the mixer-settler stage wherein it initially contacts the organic phase is from 1.1 to 5.0 times longer than the retention time of the feedstock in any of one or more mixer-settler stages wherein it subsequently contacts the organic phase.

3. The process of claim 1 wherein the reagent composition comprises:

(a) one or more hydroxy aryl ketone oxime compounds of Formula I or II,

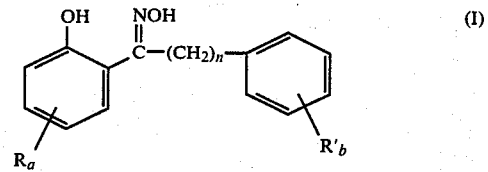

(I)

in which R and R' may be individually alike or different and are saturated aliphatic groups of 1–25 carbon atoms, ethylenically unsaturated aliphatic groups of 3–25 carbon atoms or —OR'' where R'' is a saturated or ethylenically unsaturated aliphatic group as defined; n is 0 or 1; and a and b are each 0, 1, 2, 3 or 4, with the proviso that both are not 0 and the total number of carbon atoms in $R_a$ and $R'_b$ is from 3 to 25,

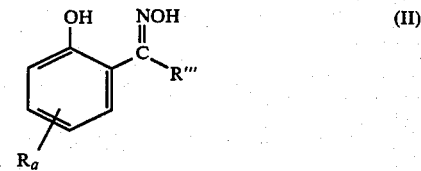

(II)

in which R and a are as defined with respect to Formula I and R''' is a saturated aliphatic group of 1–25 carbon atoms or an ethylenically unsaturated aliphatic group of 3–25 carbon atoms, with the proviso that the total number of carbon atoms in $R_a$ and R''' is from 3 to 25; and/or (b) one or more hydroxy aryl aldoxime compounds of Formula III,

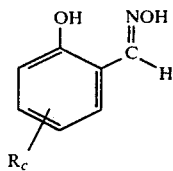

(III)

in which R is as defined above with respect to Formulas I and II, c has a value of 1, 2, 3 or 4, and the total number of carbon atoms in $R_c$ is from 3 to 25.

4. The process of claim 3 wherein the reagent composition comprises 2-hydroxy-5-nonyl benzaldoxime.

5. The process of claim 3 wherein the reagent composition comprises 2-hydroxy-5-dodecyl benzaldoxime.

6. The process of claim 3 wherein the reagent composition comprises 2-hydroxy-5-nonyl phenyl methyl ketone oxime.

7. In a solvent extraction process for recovery of copper from an aqueous feedstock solution containing dissolved copper and iron values wherein the feedstock is contacted with an organic phase comprising a reagent composition including a 2-hydroxy-5-dodecyl benzaldoxime extractant and wherein contact between the feedstock and the organic phase is accomplished by means of countercurrent flow of feedstock and organic phase through two or more mixer-settler extraction stages, the improvement comprising providing longer residence time for the feedstock in one or more of said mixer-settler stages wherein the feedstock initially contacts the organic phase than in one or more of the mixer-settler stages wherein the feedstock subsequently contacts the organic phase, whereby the molar ratio of copper-extractant complexes to iron-extractant complexes formed in the mixer-settler stage wherein the feedstock initially contacts the organic phase is increased and the overall copper/iron selectivity of the reagent composition is enhanced.

8. In a solvent extraction process for recovery of copper from an aqueous feedstock solution containing dissolved copper and iron values wherein the feedstock is contacted with an organic phase comprising a reagent composition including a 2-hydroxy-5-nonyl phenyl methyl ketone oxime extractant and wherein contact between the feedstock and the organic phase is accomplished by means of countercurrent flow of feedstock and organic phase through two or more mixer-settler extraction stages, the improvement comprising providing longer residence time for the feedstock in one or more of said mixer-settler stages wherein the feedstock initially contacts the organic phase than in one or more of the mixer-settler stages wherein the feedstock subsequently contacts the organic phase, whereby the molar ratio of copper-extractant complexes to iron-extractant complexes formed in the mixer-settler stage wherein the feedstock initially contacts the organic phase is increased and the overall copper/iron selectivity of the reagent composition is enhanced.

9. In a solvent extraction process for recovery of copper from an aqueous feedstock solution containing dissolved copper and iron values wherein the feedstock is contacted with an organic phase comprising a reagent composition including a 2-hydroxy-5-nonyl benzaldoxime extractant and wherein contact between the feedstock and the organic phase is accomplished by means of countercurrent flow of feedstock and organic phase through two or more mixer-settler extraction stages, the improvement comprising providing longer residence time for the feedstock in one or more of said mixer-settler stages wherein the feedstock initially contacts the organic phase than in one or more of the mixer-settler stages wherein the feedstock subsequently contacts the organic phase, whereby the molar ratio of copper-extractant complexes to iron-extractant complexes formed in the mixer-settler stage wherein the feedstock initially contacts the organic phase is increased and the overall copper/iron selectivity of the reagent composition is enhanced.

* * * * *